US012779600B2

(12) United States Patent
Saito

(10) Patent No.: US 12,779,600 B2
(45) Date of Patent: Nov. 3, 2026

(54) METHOD FOR MANUFACTURING A MECHANICAL STRUCTURAL MEMBER

(71) Applicant: NSK STEERING & CONTROL, INC., Tokyo (JP)

(72) Inventor: Takeshi Saito, Gunma (JP)

(73) Assignee: NSK STEERING & CONTROL, INC., Tokyo (JP)

( * ) Notice: Subject to any disclaimer, the term of this patent is extended or adjusted under 35 U.S.C. 154(b) by 23 days.

(21) Appl. No.: 18/293,686

(22) PCT Filed: Apr. 26, 2023

(86) PCT No.: PCT/JP2023/016551
§ 371 (c)(1),
(2) Date: Jan. 30, 2024

(87) PCT Pub. No.: WO2023/218974
PCT Pub. Date: Nov. 16, 2023

(65) Prior Publication Data

US 2024/0335914 A1 Oct. 10, 2024

(30) Foreign Application Priority Data

May 9, 2022 (JP) ................................ 2022-077202

(51) Int. Cl.
*B23P 15/14* (2006.01)
*B23P 23/04* (2006.01)
*C21D 1/18* (2006.01)

(52) U.S. Cl.
CPC ............... *B23P 15/14* (2013.01); *B23P 23/04* (2013.01); *C21D 1/18* (2013.01)

(58) Field of Classification Search
CPC ...................................................... B23P 15/14
See application file for complete search history.

(56) References Cited

U.S. PATENT DOCUMENTS 5,310,432 A * 5/1994 Fukui ...................... B21H 5/02 148/330
5,528,917 A * 6/1996 Bajraszewski ......... B21H 5/022 72/14.3

(Continued)

FOREIGN PATENT DOCUMENTS

CN 201186375 Y 1/2009
CN 105714027 A 6/2016

(Continued)

OTHER PUBLICATIONS

English Machine Translation of JP2006274315A (Year: 2006).*

(Continued)

*Primary Examiner* — Sarang Afzali
(74) *Attorney, Agent, or Firm* — Sughrue Mion, PLLC

(57) ABSTRACT

Provided is a mechanical structural member that can suppress deformation and has high precision and excellent quality. In a mechanical structural member (triangular threaded shaft 31) in which grooves (32) and teeth (33) are formed by plastic working and a hardened layer (31*a*) is formed on a surface of the teeth (33), the mechanical structural member has a sorbite structure, and Rockwell hardness in a region P excluding the hardened layer (31*a*) is 13 to 28 (HRC). A variation in the Rockwell hardness in the region P excluding the hardened layer (31*a*) is within 6 (HRC).

5 Claims, 8 Drawing Sheets

(56) References Cited

U.S. PATENT DOCUMENTS

| | | | | | |
|---|---|---|---|---|---|
| 5,700,120 | A * | 12/1997 | Manning | F16B 31/06 | |
| | | | | 411/389 | |
| 8,940,109 | B2 * | 1/2015 | Nagata | C23C 8/02 | |
| | | | | 148/226 | |

FOREIGN PATENT DOCUMENTS

| | | | | |
|---|---|---|---|---|
| JP | 2003-119518 | A | | 4/2003 |
| JP | 2006274315 | A | * | 10/2006 |
| JP | 2013-92212 | A | | 5/2013 |
| JP | 2015-42897 | A | | 3/2015 |
| JP | 2016-112617 | A | | 6/2016 |

OTHER PUBLICATIONS

International Search Report (PCT/ISA/210) issued on Jul. 25, 2023 by the International Searching Authority in International Patent Application No. PCT/JP2023/016551.

Written Opinion (PCT/ISA/237) issued on Jul. 25, 2023 by the International Searching Authority in International Patent Application No. PCT/JP2023/016551.

Communcation dated Jan. 22, 2026, issued by the China National Intellectual Property Administration in Chinese Application No. 202380013097.7.

* cited by examiner

FIG. 1A (PRIORT ART)
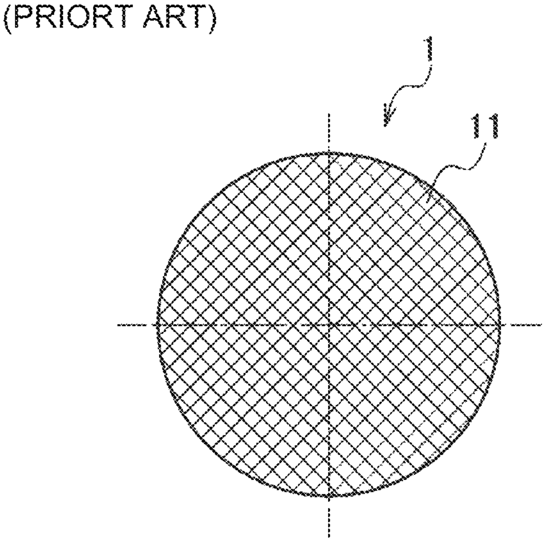
FIG. 1B (PRIORT ART)
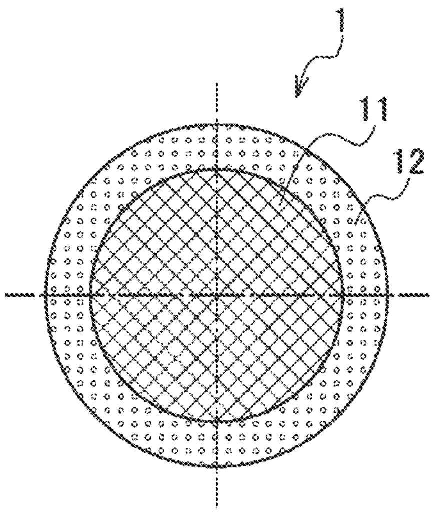
FIG. 1C (PRIORT ART)
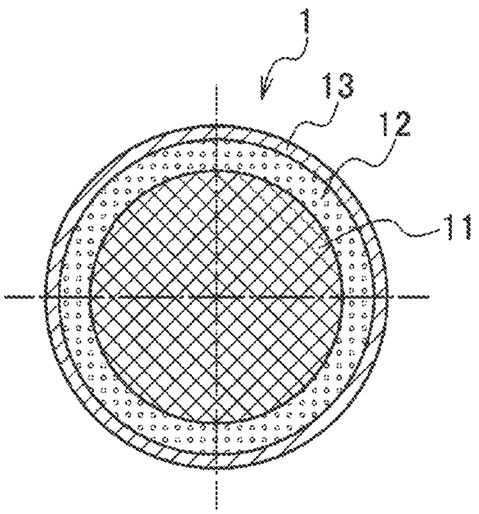

FIG. 2A (PRIORT ART)
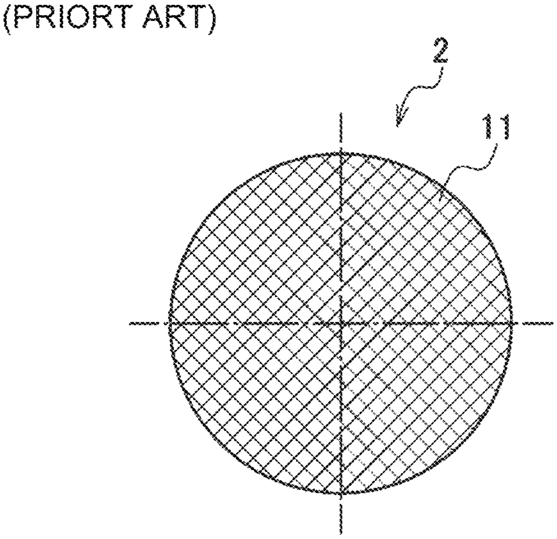
FIG. 2B (PRIORT ART)
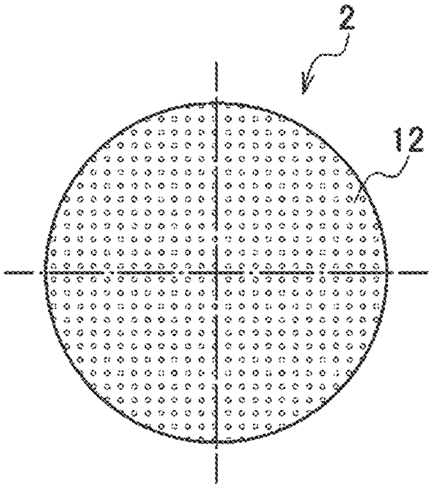
FIG. 2C (PRIORT ART)
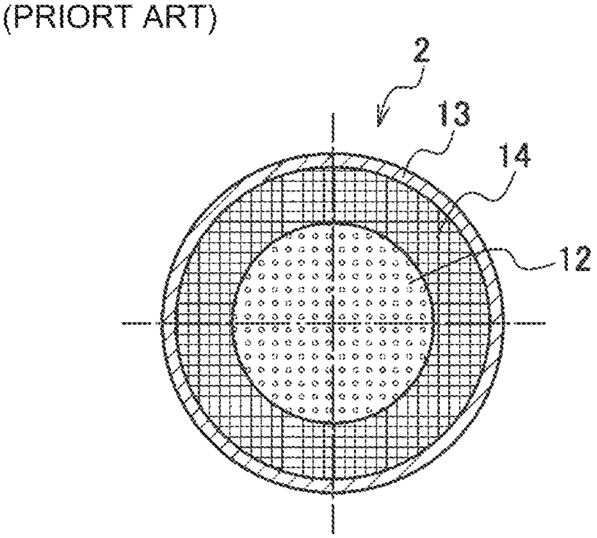

FIG. 10
| | INVENTION EXAMPLE No. 1 | COMPARATIVE EXAMPLE No. 1 |
|---|---|---|
| SURFACE PORTION<br>× 400 | 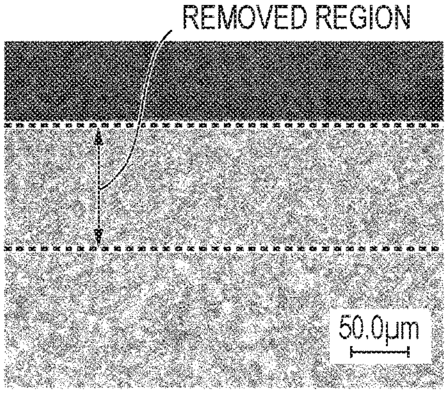 | 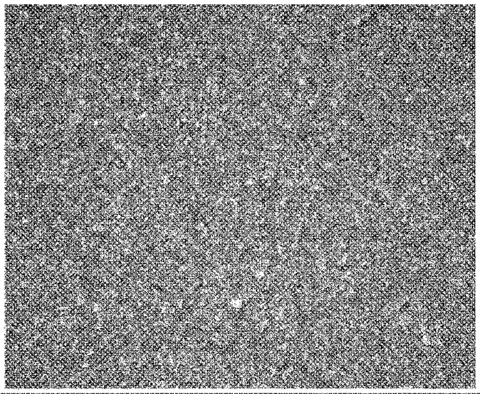 |
| POSITION OF DIAMETER 11 mm<br>× 400 | 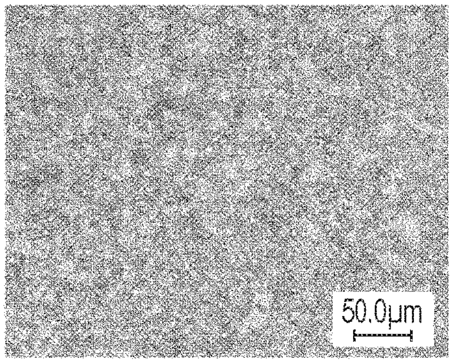 | |
| CORE PORTION<br>× 400 | 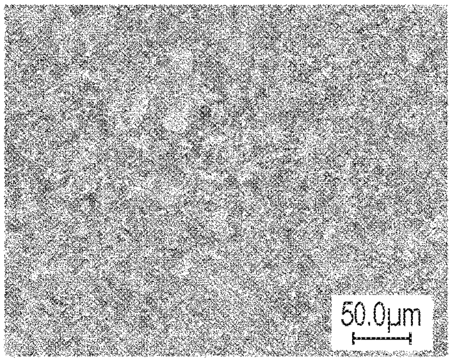 | 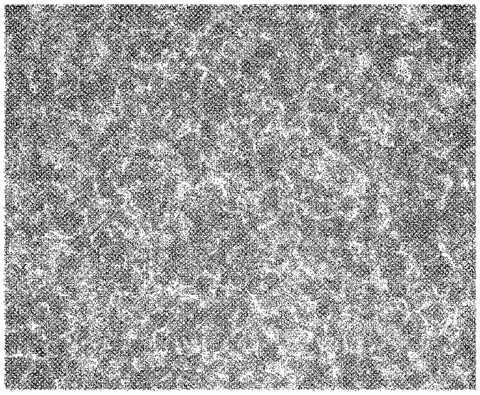 |

METHOD FOR MANUFACTURING A MECHANICAL STRUCTURAL MEMBER

CROSS-REFERENCE TO RELATED APPLICATIONS

This application is a National Phase Entry of PCT International Application No. PCT/JP2023/016551 filed on Apr. 26, 2023, which claims priority to Japanese Patent Application No. 2022-077202 filed on May 9, 2022, the contents of all of which are incorporated herein by reference in their respective entireties.

TECHNICAL FIELD

The present invention relates to a mechanical structural member that requires a high degree of precision and a method for manufacturing the same.

BACKGROUND ART

Generally, when manufacturing products by processing steel materials, the steel materials are subjected to refining by heat treatment (quenching/tempering) to improve machinability, grindability, toughness, wear resistance, and the like. Heat treatment such as annealing is performed as necessary to improve machinability and workability.

The reason is that, as is already well known, it is difficult to make hardness and structure uniform even by performing quenching and tempering (refining) under general heat treatment conditions when processing a round bar material with a relatively uniform shape.

In recent years, in response to a demand for higher performance in precision machinery, studies are being conducted to improve accuracy and performance in a field of steel products such as ball threaded shafts, threaded shafts, and gears. In particular, a method of processing thread grooves by rolling has excellent productivity and can reduce manufacturing costs, so there is an increasing demand for a manufacturing method that can obtain a threaded shaft with excellent dimensional accuracy by rolling.

For example, Patent Literature 1 proposes a method for manufacturing a ball threaded shaft in which a thread groove is formed by rolling. The manufacturing method described in Patent Literature 1 described above is a method of refining a round bar material to have a hardness of HRC25 to HRC35, annealing an outer circumferential surface thereof to have a hardness of HRC23 or less, forming a thread groove by rolling, and hardening a surface of the groove by induction hardening. It is described that it becomes possible to manufacture a ball threaded shaft with less bending after heat treatment, less thread groove lead error, and less pitch error, without deteriorating workability.

Patent Literature 2 discloses a method for manufacturing a threaded shaft, in which thread grooves are rolled on an outer circumferential surface of a normalized steel material, and the surface is further subjected to nitriding treatment or sulfur-nitriding treatment. The above-described Patent Literature 2 describes that the precision quality and durability of ball screws and sliding screws can be improved because a surface hardened layer can be formed on a surface of a threaded shaft without quenching treatment that involves high-temperature heating, rapid cooling, and transformation.

CITATION LIST

Patent Literature

Patent Literature 1: JP2003-119518A
Patent Literature 2: JP2013-92212A

SUMMARY OF INVENTION

Technical Problem

However, in recent years, there has been a demand for further improvement in dimensional accuracy, and even if the manufacturing method described in Patent Literature 1 or 2 is used, it may not be possible to obtain desired processing accuracy.

When the annealing processing described in Patent Literature 1, the nitriding processing or the sulfur-nitriding processing described in Patent Literature 2, or the like is performed, manufacturing processing becomes complicated, and the number of processes and processing time increase. As a result, productivity decreases.

The present invention has been made in view of the above-described problems, and an object of the present invention is to provide a mechanical structural member having high precision and excellent quality.

An object of the present invention is to provide a method for manufacturing a mechanical structural member that has excellent productivity, reduces tool wear during manufacturing, and can manufacture a mechanical structural member that has high precision and excellent quality.

Solution to Problem

The above-described object of the present invention is achieved by the following configuration [1] or [2].

[1] A mechanical structural member in which grooves and teeth are formed by plastic working and a hardened layer is formed on a surface of the teeth, where the mechanical structural member has a sorbite structure, and Rockwell hardness in a region excluding the hardened layer is 13 to 28 (HRC), and a variation in the Rockwell hardness is within 6 (HRC).

[2] A method for manufacturing a mechanical structural member according to [1], the manufacturing method including:

a refining step of refining a steel material to obtain a refined material that has a sorbite structure, has a Rockwell hardness of 13 to 28 (HRC) in a material portion excluding a predetermined thickness from a surface, and has a variation in Rockwell hardness within 6 (HRC) in the material portion; and a plastic working step of performing plastic working on a surface of the refined material where the grooves and teeth are formed, where neither annealing nor annealing is performed between the refining step and the plastic working step.

Advantageous Effects of Invention

According to the present invention, a mechanical structural member having high precision and excellent quality can be provided.

According to the present invention, it is possible to provide a method for manufacturing a mechanical structural member, which can reduce tool wear during manufacturing and manufacture a mechanical structural member with high precision and excellent quality.

BRIEF DESCRIPTION OF DRAWINGS

FIGS. 1A to 1C are schematic diagrams illustrating changes in a steel material when a ball threaded shaft is manufactured by the manufacturing method suggested in Patent Literature 1.

FIGS. 2A to 2C are schematic diagrams illustrating changes in a steel material when a ball threaded shaft is manufactured under heat treatment conditions suggested in Patent Literature 1.

FIG. 10 is a photograph substituted for a drawing illustrating microscopic photographs taken of metal structures of the invention example No. 1 and comparative example No. 1 after rolling.

DESCRIPTION OF EMBODIMENTS

Figure 3:
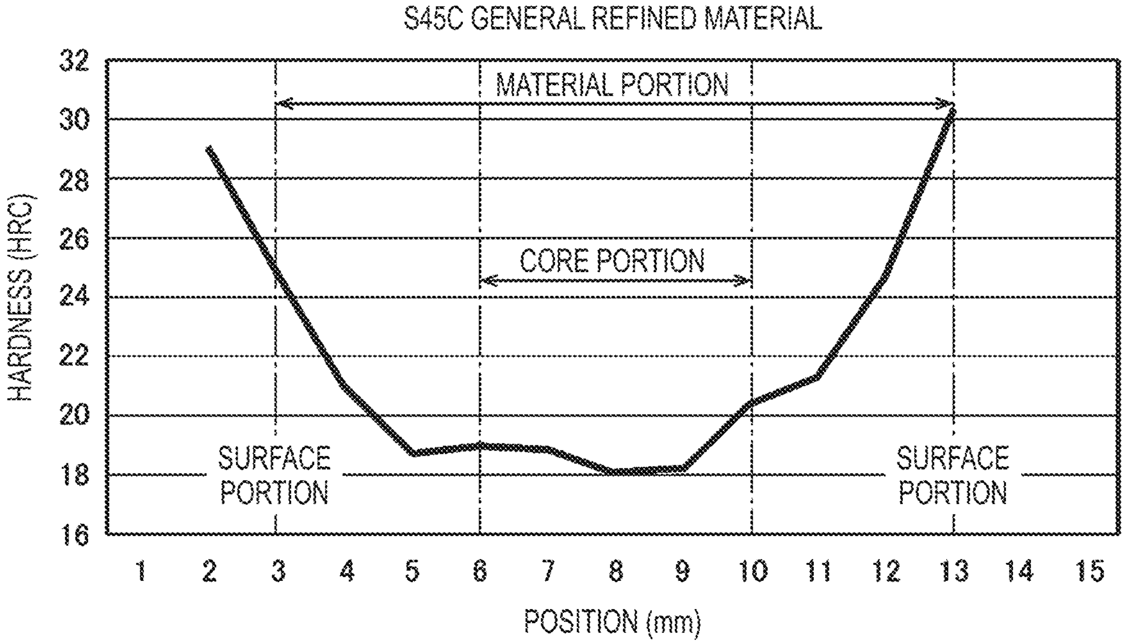
FIG. 3 (PRIOR ART)
FIG. 3 is a graph diagram illustrating a relationship between hardness and position of S45C material after tempering.

The inventors of the present invention conducted various studies on a mechanical structural member and a manufacturing method thereof that can improve processing accuracy while considering manufacturing methods of the related art.

According to Patent Literature 1, when a tempered portion is left and a surface is subjected to annealing (softening) heat treatment, thread accuracy can be improved even when rolling and induction hardening are performed. That is, Patent Literature 1 suggests performing (A-1) quenching, (A-2) tempering (refining), (B) annealing, and (C) induction hardening.

Here, a state of a structure when a ball threaded shaft is manufactured based on a composition of S55C steel material described in JIS G4051:2016 (carbon steel materials for mechanical structures) using the manufacturing method suggested in Patent Literature 1 will be described below. The main composition of S55C steel material is C: 0.52 to 0.58 (mass %), and when considering contents of Si, Mn, P, and S as equivalent to contents described in JIS G4051, the heat treatment conditions for the steel material are, for example, as follows.

(A-1) Quenching: 800° C. to 850° C. Water cooling Hardness (Rockwell C scale hardness) HRC 60 or more (A-2) Tempering: 550° C. to 650° C. Rapid cooling Hardness HRC around 30

(B) Annealing: 790° C. Furnace cooling Hardness HRC 0 to HRC 8.5 HRC 0 to HRC 8.5, which is a hardness due to (B) annealing, is a value converted from Brinell hardness of 149 HB to 192 HB.

Here, the changes in the steel material due to the steps (A-1), (A-2), and (B) will be described in more detail with reference to the drawings.

FIGS. 1A to 1C are schematic diagrams illustrating changes in a steel material when a ball threaded shaft is manufactured by the manufacturing method suggested in Patent Literature 1. FIGS. 2A to 2C are schematic diagrams illustrating changes in a steel material when a ball threaded shaft is manufactured under the heat treatment conditions suggested in Patent Literature 1.

(A-1) In quenching, a round bar material is heated to A3 transformation point +30° C. to 50° C. to turn the round bar material into γ iron (gamma iron: austenite face-centered cubic crystal), and then rapid cooling (quenching) is performed to make martensite (body-centered cubic crystal (tetragonal)), which is an extremely hard and brittle structure.

(A-2) In tempering, the extremely hard and brittle structure that has become martensite is heated to a tempering temperature and then cooled, resulting in a slight decrease in hardness and obtainment of toughness.

As illustrated in FIG. 1A, a round bar material 1 is refined by (A-1) and (A-2) described above, and a tempered portion 11 is formed in which the hardness of an entire material is set in a range of HRC 25 to HRC 35.

(B) In annealing (annealing), the refined steel material is sufficiently maintained as an austenitic structure (790° C.) and then slowly cooled in a furnace. As a result, as illustrated in FIG. 1B, a softened layer 12 having a hardness of HRC 23 or less is formed on a surface.

After performing peeling processing, centerless grinding, and rolling processing, the surface is induction hardened to form a hardened layer 13 quenched to a range of HRC 55 to HRC 62, as illustrated in FIG. 1C.

Generally, a purpose of annealing is to remove internal residual stress caused by processing, soften the structure, and improve malleability. That is, annealing reduces lattice defects in the metal structure and recrystallizes the material, so residual stress also decreases and the material is softened.

Therefore, when a threaded shaft is manufactured using the annealing heat treatment temperature of the related art and the manufacturing method of the related art, which is described above, it is conceivable that the tempered portion 11 may not actually remain.

Specifically, as illustrated in FIG. 2A, the round bar material 2 is refined by quenching and tempering, and the tempered portion 11 is formed, but as illustrated in FIG. 2B, due to annealing, the softened layer 12 is formed in a radial center of the round bar material 1. Since annealing is performed at a high temperature, the hardness decreases to, for example, 0 to 9 (HRC). Then, after performing peeling processing, centerless grinding, and rolling processing, the surface is induction hardened, thereby as illustrated in FIG. 2C, the hardened layer 13 hardened by induction hardening is formed on an outermost surface, and a hardened layer 14 is further formed by induction hardening between the softened layer 12 and the hardened layer 13 on the surface.

The inventors thought that when the above-described manufacturing method of the related art is performed under general heat treatment conditions, the softened layer 12 is in a center of the threaded shaft, and distortion of the threaded shaft may occur during rolling processing and induction hardening, causing a decrease in dimensional accuracy.

Therefore, the inventors of the present invention conducted further intensive studies on a method for manufacturing a triangular screw that can reduce deformation, has high precision, and has excellent quality.

First, the inventors of the present invention investigated causes of a decrease in dimensional accuracy when manufacturing a screw using a cold finished bar (coil-to-bar) obtained from a steel material manufacturer.

When obtaining a cold finished bar, generally a part of the screw material is designated as a range and the hardness of the cold finished rod is instructed to the steel material manufacturer. However, in the cold finished bar, a surface layer is hardened but the hardness decreases as the layer is closer to a core portion. Therefore, the surface of the cold finished bar has the designated hardness, but the hardness of the core portion is unknown, and thus the cold finished bar as received cannot achieve the required accuracy.

FIG. 3 is a graph diagram illustrating a relationship between hardness and position of S45C material (manufactured by Nippon Steel Corporation) that has been refined after the coil material has been subjected to coil drawing. A measured diameter of the S45C material is 16 mm. In the graph diagram illustrated in FIG. 3, one end of the diameter in a cross section perpendicular to a longitudinal direction of the S45C material is set as 0 mm, and the other end is set as 16 mm. In the specification, the longitudinal direction of a screw, a screw material, a refined material, or the like refers to a direction in which a threaded shaft extends.

As a result of measuring the hardness of the S45C material tempered after coil drawing. among the material portions excluding a region of a predetermined thickness (for example, 3 mm) from the surface, in a surface part represented by 3 mm and 13 mm positions illustrated in FIG. 3, and a core portion represented in a range of 6 mm to 10 mm, the core portion shows a lower value by about 12 (HRC), resulting in a graph depicting a U curve.

As such, if the hardness is designated, although the hardness of the obtained S45C refined material is generally recognized to be within the designated range, in reality there is a large difference in hardness between the surface portion and the core portion.

Regarding cold finished bars (coil-to-bar) obtained from steel manufacturers, processing in which the coil material is returned to a straight bar is performed at the steel manufacturer, so the processing causes variation in hardness. In other words, in processing of gradually processing a coiled material into a linear shape using a roller, to make a twisted or bent material into a linear shape, there are parts that are stretched or compressed, which causes variation in hardness.

The inventors of the present application have discovered that when thread rolling is actually performed using a material with variation in hardness as described above and the accuracy of the tooth profile, tooth trace, and thread pitch is measured, errors will occur in a gear testing machine and measurement will be difficult.

Therefore, the inventors of the present invention believe that if variations in metal structure and hardness can be significantly reduced in steel materials before plastic working, particularly rolling, processing accuracy can be improved, so the inventors studied the refining conditions for steel materials.

For example, even when a steel material is heated to a typical quenching temperature, cooling starts from the surface, so the hardness of the core portion becomes significantly lower and the hardness of the surface becomes higher. When the steel material is cooled without being heated to the core portion, the difference in hardness between the core portion and the surface becomes even more significant.

When the tempering temperature is increased to, for example, 570° C., to reduce the surface hardness, the hardness of the core portion further decreases, making it difficult to make the hardness and structure uniform.

As a result of the above-described considerations, the inventors of the present invention have discovered that a highly accurate mechanical structural member can be obtained by reducing the variation in hardness in steel materials after quenching, selecting the conditions under which a uniform martensite structure is formed, determining a target value of hardness after tempering, and determining the tempering temperature.

The present invention has been made based on such findings.

Embodiments of the present invention will be described in detail below. The present invention is not limited to the embodiments described below, and can be implemented with any changes within a scope of the gist of the present invention.

Method for Manufacturing Mechanical Structural Member

The present embodiment is a manufacturing method for manufacturing a mechanical structural member, which will be described below, and includes refining processing for refining a steel material to obtain a refined material having predetermined characteristics, surface removal processing for obtaining a material by removing a predetermined thickness from a surface of the refined material, and plastic working processing for performing plastic working on the surface of the material where grooves and teeth are formed. Neither annealing nor annealing is performed between the refining processing and the plastic working processing.

Hereinafter, as a first embodiment, a method for manufacturing a mechanical structural member will be specifically described, and as a second embodiment, a method for manufacturing a triangular screw among mechanical structural members will be specifically described.

First Embodiment

Refining Processing

The refining processing is a processing of refining a steel material and obtaining a refined material having a sorbite structure in which the Rockwell hardness in a material portion excluding a predetermined thickness from the surface is 13 to 28 (HRC), and a variation in Rockwell hardness in the material portion is within 6 (HRC).

The refining processing generally refers to quenching processing and tempering processing, and is processing that can adjust the hardness of the steel material.

In the specification, “Rockwell hardness” is a value converted from the value measured according to Vickers hardness test described in JIS Z 2244:2009.

In the present embodiment, in the quenching processing, the steel material is heated to a predetermined temperature, held, and then cooled. Regarding the heating temperature and holding time in the quenching processing, it is preferable to select conditions such that the structure of the steel material after the quenching processing becomes a uniform martensitic single phase structure and the crystal grains do not become coarse.

A uniform martensitic single phase structure means that the grain size of the structure is uniform from the surface to the center, and is not a mixed structure of ferrite and martensite. but is in a state where the austenite structure is completely transformed to martensite. However, when the structure is quantitatively measured using a scanning electron microscope, transmission electron microscope, X-ray diffraction method, or the like, it is not necessary that the martensite structure alone accounts for 100 area %, and ferrite and the like may inevitably remain as impurities.

By confirmation, it can be determined that during quenching, the inside of the furnace was uniformly heated, even the temperature of the center of the steel material rose, and the steel material completely became an austenite structure.

Conditions such as temperature and time during quenching to keep the variation in structure and hardness of the steel material after quenching within the above-described ranges vary depending on the composition of the used steel material and the type of furnace. For example, regarding the quenching temperature, based on a phase diagram of steel, depending on an amount of contained carbon, the steel material can be made into a complete austenite structure by setting the furnace at a temperature equal to or higher than A3 transformation temperature and sufficiently heating a workpiece to the center.

When the steel material is completely made into an austenitic structure and then rapidly cooled, the martensitic transformation can sufficiently proceed. The cooling method is not particularly limited, but water cooling, oil cooling, or the like can be used.

Cooling with oil can prevent the formation of a martensitic coarsening structure and prevent a test material from becoming brittle and cracking after quenching.

On the other hand, when cooling with water, many water vapor bubbles adhere to a surface of the steel material after quenching, and due to the insulation effect of the bubbles, rapid cooling may not be possible and variation in hardness may occur. Therefore, it is desirable to use oil cooling.

When martensitic transformation has not progressed sufficiently after cooling, it is also possible to adopt a method of rapidly cooling and then maintaining the low temperature further by sub-zero treatment or the like to allow martensitic transformation to proceed. However, since cooling equipment and processing become complicated and the manufacturing cost increases, it is preferable to advance the martensitic transformation by a normal cooling method.

Especially, in the present embodiment, it is also an important factor to reduce variation in Rockwell hardness in a material portion of the steel material after quenching, so it is preferable to select oil cooling, which is less likely to cause variations in hardness.

As other conditions in the quenching processing, as the number of materials subjected to the quenching treatment increases, it generally becomes difficult to make the quenching temperature and cooling conditions uniform, so it is preferable to adjust the number of materials subjected to the quenching treatment as well.

As a specific method for determining the conditions (heating temperature and heating time) of the quenching processing, one method is to use a test material having substantially the same shape and composition as the steel material to be used, and to perform quenching test processing on the test material in which the test material is quenched under various conditions. In other words, as the quenching test processing, before the refining processing, the structure of the test materials that had been quenched under various conditions is observed to check whether the structure of the test material is a uniform martensitic single phase structure, and then the quenching heating conditions that result in a uniform martensitic single phase structure are selected. In the present embodiment, as will be described below, the conditions for the tempering processing are selected so that the Rockwell hardness and variation in the material portion after the tempering processing are within desired ranges. However, to keep the hardness and variation within the above-described desired ranges after the tempering processing, even after the quenching processing, it is preferable to measure the variation in Rockwell hardness in the material portion and select quenching heating conditions such that the variation is within 6 (HRC).

After the above-described quenching processing, tempering processing is performed as described above, and the obtained refined material is made into a sorbite structure (including a microuniform structure equivalent to sorbite) which is a uniform microstructure. Since the refined material made into a sorbite structure has ductility and mechanical strength necessary for plastic working, the processing accuracy can be improved by the tempering processing.

Through the tempering processing, the Rockwell hardness of the material portion is set to 13 to 28 (HRC), and the variation in Rockwell hardness in the material portion is made to be within 6 (HRC).

When the Rockwell hardness of the material portion of the refined material obtained by the tempering processing is less than 13 (HRC), plastic working becomes difficult. On the other hand, when the Rockwell hardness of the material portion exceeds 28 (HRC), the surface of the material after surface removal becomes hard, so processing is possible, but the lifespan of a die, which is a tool, is significantly reduced. When the variation in Rockwell hardness exceeds 6 (HRC), the thread processing accuracy decreases.

Therefore, the tempering processing shall be performed so that the Rockwell hardness of the material portion of the refined material after the tempering processing is 13 to 28 (HRC) and the variation thereof is within 6 (HRC).

To control the Rockwell hardness of the material portion and variation thereof as described above by tempering, the heating temperature in the tempering processing is preferably adjusted based on a graph of the tempering temperature and hardness specific to the used steel material. Regarding the graph of the tempering temperature and hardness specific to the steel material, a known graph may be obtained, or a graph may be created by tempering the used steel material at various temperatures and measuring the hardness thereafter.

Similar to the method of determining the conditions of the quenching processing, also in the tempering processing, a specific method for determining the heating conditions is to use a test material after quenching and temper the test material under various conditions.

That is, as the tempering test processing, the structures of the test materials tempered under various conditions are observed and the variation in hardness is measured. Tempering heating conditions are selected such that a sorbite structure is formed, the Rockwell hardness of the material portion of the test material is 13 to 28 (HRC), and the variation in Rockwell hardness in the material portion is within 6 (HRC). Thereby, the actual tempering processing can be performed using the tempering heating conditions selected in the tempering test processing.

The Rockwell hardness of the material portion of the test material is preferably 20 to 26 (HRC). The variation in Rockwell hardness is preferably within 2 (HRC), more preferably within 1 (HRC).

The variation in hardness after the tempering test processing is preferably measured on a straight line portion from a random position A on the surface layer of the material portion to a position B on the surface layer opposite thereto. By plotting the hardness of the straight line portion on a graph with hardness on a vertical axis and position on a horizontal axis, changes in hardness depending on position can be investigated. In the present embodiment, when a difference between a maximum value and a minimum value obtained by measurement is within 6 (HRC), it can be considered that the hardness variation is within 6 (HRC).

Depending on the type of steel material, the hardness after quenching may affect the hardness after tempering. Therefore, in addition to determining the tempering temperature based on the graph of tempering temperature and hardness, it is preferable that the final tempering heating conditions determined by also considering the measurement results of the hardness test of the test material after quenching.

Although the details will be described below, the hardness after quenching changes depending on the amount of carbon contained in the steel material. Therefore, when the hardness after quenching is equal to or higher than critical hardness, it can be determined that minimum quenching has been performed.

For example, the hardness measurement result of the core portion of the test material after the quenching test is equal to or higher than the critical hardness, but if it is low, the hardness of the test material after the tempering test may be lower than a desired range. Therefore, it is preferable to set the tempering temperature to a lower temperature than the temperature derived from the graph, and to set the tempering heating conditions so that the hardness of the refined material becomes harder after tempering.

On the other hand, when the hardness measurement result of the test material after the tempering test shows that the entire material portion is hard, there is a possibility that the hardness of the test material after the tempering test will be higher than the desired range. Therefore, it is preferable to set the tempering temperature higher than the temperature derived from the graph and set the tempering heating conditions so that the hardness of the refined material after tempering is reduced.

However, when the core portion hardness measurement result is lower than the critical hardness, it is assumed that either the core portion of the steel material has not been quenched (the core portion has not reached the heating temperature), or the temperature inside the furnace varies. Therefore, it is preferable to review the heating conditions, such as increasing the heating temperature during quenching or lengthening the soaking conditions.

Measurement of the hardness and observation of the structure of the test material after the quenching test can be omitted. Here, it is preferable that before the quenching processing, quenching is performed using a refined test material having approximately the same shape and composition as the steel material, and then a refining test processing is performed in which the refining test material after quenching is tempered at a heating temperature selected based on the relationship between the tempering temperature and hardness specific to the steel material.

The refining test processing is processing of selecting quenching heating conditions and tempering heating conditions such that the structure of the refined test material after tempering becomes a sorbite structure, the Rockwell hardness of the material portion is 13 to 28 (HRC), and the variation in Rockwell hardness is within 6 (HRC).

Therefore, it is preferable for the actual quenching processing to be performed using the quenching heating conditions selected in the refining test processing, and the tempering processing to be performed using the tempering heating conditions selected in the tempering test processing.

In the refining test processing, when a sorbite structure was not formed as a result of tempering the refining test material after quenching, since there is a possibility that martensitic transformation has not been completed after quenching, for example, the heating conditions and cooling conditions of the quenching processing should be reviewed.

When the hardness or the variation thereof is not within the desired range, since the quenching and tempering temperatures may not be appropriate or the core portion may not have been completely quenched, the heating conditions or the like for the quenching and tempering processing should be reviewed.

Surface Removal Processing

After the above-described refining processing, the hardness of the refined material increases rapidly from a certain position toward the surface. Therefore, in general, when forming grooves and teeth of a mechanical structural member by plastic working, plastic working is performed after a predetermined thickness is removed (cut and ground) from the surface of the refined material to obtain a material. By the plastic working, a surface shape of the refined material when viewed from the side has a plurality of grooves and teeth between each groove. Here, the thickness to be removed when S45C material is selected as the steel material will be described below.

Figure 4:
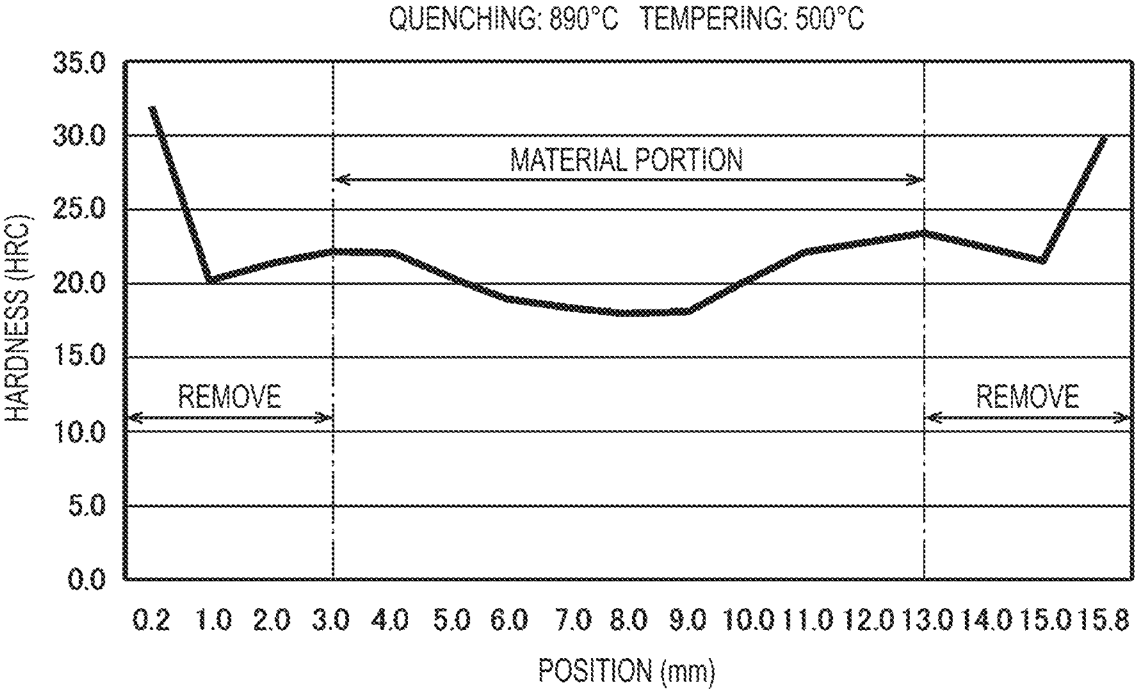
FIG. 4 is a graph diagram illustrating a relationship between hardness and position of a refined material in a present embodiment, where a vertical axis shows the hardness and a horizontal axis shows the position of a surface layer in a cross section perpendicular to a longitudinal direction of the refined material.

FIG. 4 is a graph diagram illustrating a relationship between hardness and position of a refined material, where a vertical axis shows the hardness and a horizontal axis shows a position of a surface layer in a cross section perpendicular to a longitudinal direction of the refined material. In FIG. 4, the hardness is measured up to a vicinity of the surface. For the refined material shown in FIG. 4, the heating temperature in the quenching processing was set to 890° C. and the soaking time was set to 30 minutes to uniformly heat the inside of the furnace, and the material is cooled after the heating temperature in the tempering processing was set to 500° C. and the holding time was set to 120 minutes. Accordingly, a sorbite structure is obtained.

As illustrated in FIG. 4, the hardness of the refined material increases rapidly from a depth of about 1.0 mm from the surface as the layer approaches the surface.

Therefore, in the present embodiment, after the refining processing, a region from the surface to a predetermined thickness, that is, the region including at least the part where the hardness of the refined material is rapidly increasing, is removed. In the present embodiment, for example, a 3.0 mm thick region is removed from the surface to obtain the material. As a result, the hardness of the entire material portion can be made as 13 to 28 (HRC), and the variation in hardness can be kept within 6 (HRC).

In FIG. 4, the region where the hardness increases rapidly is about 1.0 mm from the surface of the refined material, so the region to be removed only needs to include at least a region where the hardness is rapidly increasing (an area up to about 1.0 mm from the surface), and it is preferable to remove to a depth of about 2.0 mm to 3.0 mm from the surface.

As illustrated in FIG. 4, when the material is removed to a depth of 3.0 mm from the surface of the refined material, the hardness of the material portion before plastic working is slightly lower near the center and slightly higher near the surface, but the hardness is approximately uniform in a radial direction of the material portion.

In the present embodiment, although the surface removal processing was implemented, the surface removal processing is not an essential processing. For example, after the above-described refining processing, when the structure of the obtained refined material is a sorbite structure, and the Rockwell hardness of the entire refined material is 13 to 28 (HRC) and the variation in Rockwell hardness is within 6 (HRC), the surface removal processing can be omitted. Here, the yield can be further improved.

Plastic Working Processing

In the present embodiment, in the surface removal processing, a region from the surface to a depth of about 3.0 mm is removed to obtain a refined material (material) with a diameter of about 10 mm. Then, the surface of the material on which grooves and teeth are to be formed is subjected to plastic working to form grooves and teeth of a desired shape. After plastic working, the hardness of a screw teeth tip (on an outer diameter side of the shaft) is approximately 33 (HRC), and the hardness of a screw teeth bottom (near the root) is approximately 27 (HRC). In other words, the region from 0 mm to 0.5 mm from the teeth bottom of the threaded shaft after plastic working is hardened by the plastic working, but in regions other than the hardened region, the hardness remains the same as the hardness of the material portion before plastic working.

As described above, when the structure and hardness of the refined material after refining are within the desired range and the surface removal processing is not performed, in the above-described plastic working processing, plastic working is performed on the surface of the refined material after refining where grooves and teeth are to be formed. Even then, the hardness of the screw tooth tips and screw tooth bottoms after plastic working will be the same as above, whereas in the region other than the region hardened by plastic working, the hardness remains the same as the hardness of the refined material before plastic working.

In the present embodiment, the hardness is adjusted to be substantially uniform through the above-described refining processing, and the surface has a hardness suitable for plastic working. Therefore, there is no need to perform either annealing or annealing between the refining processing and the plastic working processing.

Through the above-described processing, the mechanical structural member according to the present embodiment can be obtained.

According to the method for manufacturing a mechanical structural member according to the present embodiment, the hardness of the material before forming the grooves by plastic working has a structure and hardness suitable for plastic working, and the variation in hardness from the surface to a deep part is within 6 (HRC). Therefore, wear of the tool can be reduced, deformation due to plastic working can be prevented, and a mechanical structural member having high precision and excellent quality can be obtained.

According to the manufacturing method according to the present embodiment, 50% or more of the diameter of the refined material before the surface removal processing can be made to have substantially uniform hardness with little variation, so when performing the surface removal processing, the depth of a part to be removed can be made shallow, and thus the yield can be improved.

In the present embodiment, since there is no need to perform annealing and annealing, productivity can be improved and manufacturing costs can be reduced. When performing the plastic working processing to form grooves and teeth, if the hardness and variation in hardness of the material are within the above-described range, and a sorbite structure (including a fine uniform structure equivalent to sorbite) is also formed, processing such as annealing may be performed between the refining processing and the plastic working processing.

As described above, the present embodiment refines the steel material for forming grooves by plastic working, but is particularly suitable for forming grooves by infeed rolling.

Infeed rolling requires that a workpiece and a thread be parallel, that the workpiece not extend in the axial direction, and deform only in a radial direction where the thread is formed.

According to the manufacturing method according to the present embodiment, the Rockwell hardness of the material portion is 13 to 28 (HRC), and the material is refined to a relatively hard state, so it is possible to prevent the workpiece from extending in the axial direction during infeed rolling, and it is possible to easily obtain a mechanical structural member with excellent processing accuracy. Therefore, by infeed rolling using the refined material obtained by the method according to the present embodiment, the yield can be improved and manufacturing costs can be reduced.

Second Embodiment

As a second embodiment, a method for manufacturing a triangular screw will be specifically described. In the second embodiment illustrated below, the similar parts as in the first embodiment are indicated by the same names, and detailed description of each processing is partially omitted.

Refining Processing

S45C round bar material (φ 16 mm) is prepared as a steel material, and refining processing is performed.

First, the quenching processing is performed, but regarding the heating temperature in the quenching process, based on the carbon content (0.42 mass % to 0.48 mass %) and phase diagram of the S45C material, it is possible to set the temperature to be approximately 780° C. or higher, which is A3 transformation point, and lower than 911° C., which is the upper limit temperature of the carbon solid solution phase.

In the present embodiment, the heating temperature in the quenching processing is, for example, 890° C. To improve temperature distribution in a furnace, the soaking time to uniformly heat the inside of the furnace is set to 30 minutes, and the subsequent holding time is set to 180 minutes. Then, by cooling with oil, the structure and hardness of the steel material after the quenching processing can be adjusted to a predetermined range.

It may be difficult to make the temperature inside the furnace uniform depending on a shape, capacity, and the like of the furnace. Therefore, it is preferable to set the soaking time and holding time by considering how the heater is placed, how the workpiece is placed, and the capacity of the furnace, and the time only needs to be set so that the material is heated to the core portion at the required predetermined temperature.

Here, as a specific method for determining the conditions of the quenching processing, as in the first embodiment, one method is to use a test material having substantially the same shape and composition as the used steel material (S45C material) and perform quenching test processing in which the test materials are quenched under various conditions. In particular, the heating conditions for the actual quenching processing can be determined by observing the structures of test materials that have been quenched under various conditions and confirming whether the test materials have a uniform martensitic single phase structure.

Figure 5:
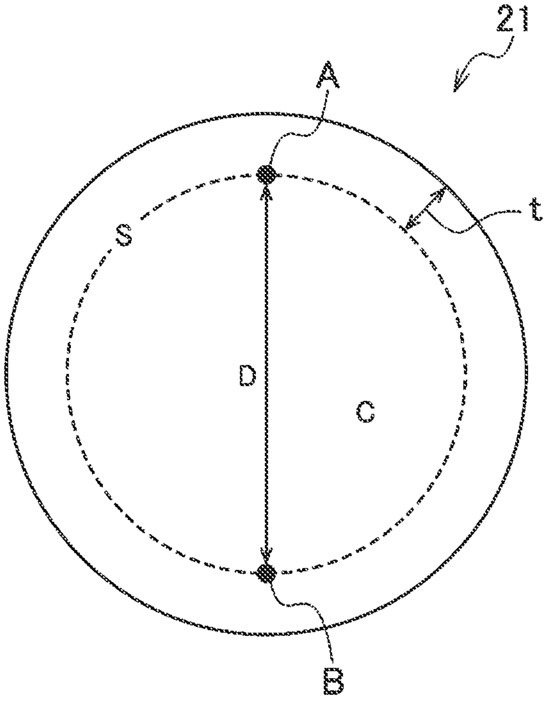
FIG. 5 is a schematic cross-sectional view illustrating a test material for explaining a hardness measurement position in the present embodiment.

FIG. 5 is a schematic cross-sectional view illustrating a test material for explaining a hardness measurement position in the present embodiment. In a cross section S perpendicular to a longitudinal direction of a test material 21, the hardness is measured for a material portion C excluding an area from a surface to a predetermined thickness t. Specifically, it is preferable to measure a diameter portion (straight line portion) D from a random position A on a surface layer of the material portion C to a position B opposite thereto. The hardness of the straight line portion is plotted in the graph diagram illustrated in FIG. 4. However, in the present embodiment, the predetermined thickness t is 3 mm, and the material portion represents a region from 3 mm to 13 mm in FIG. 4.

After the quenching processing, a tempering processing is performed. The heating temperature in the tempering processing is determined based on a graph of the tempering temperature and hardness of the S45C material.

Figure 6:
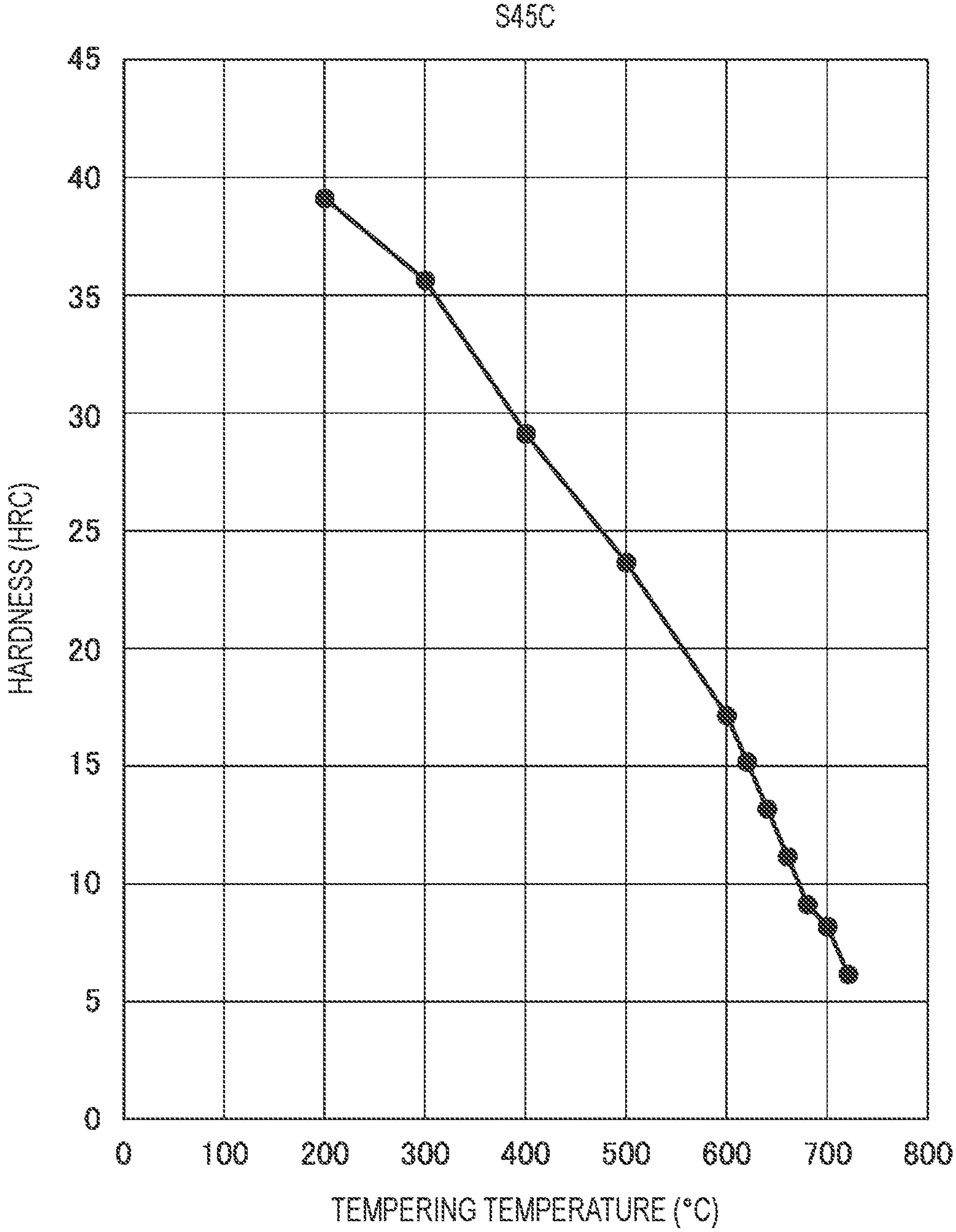
FIG. 6 is a graph diagram illustrating a relationship between tempering temperature and hardness of S45C material, where a vertical axis is Rockwell hardness and a horizontal axis is tempering temperature.

FIG. 6 is a graph diagram conceptually illustrating a relationship between tempering temperature and hardness of the S45C material, where a vertical axis is Rockwell hardness and a horizontal axis is tempering temperature. In the present embodiment, to aim for a temperature at which the hardness of the material portion of the refined material after the tempering processing is 13 to 28 (HRC), when reading the heating conditions for tempering only from the graph, the hardness of the material portion can be brought into the above range by tempering at a temperature of about 640° C. or lower, for example.

However, FIG. 6 is a conceptual diagram illustrating a relationship between tempering temperature and hardness of the S45C material, and although such behavior is generally known, the actual relationship between tempering temperature and hardness varies depending on the type of furnace, the season and the batch size for refining, the length and shape of the workpiece, and the like. Therefore, it is preferable to determine the actual tempering temperature by referring to a graph created under the same conditions as the actual tempering conditions and also considering the hardness of the steel material after quenching. Specifically, using the test material for which the quenching heating conditions have been determined, tempering is performed by adjusting the tempering temperature higher or lower than the tempering temperature obtained from the graph, and then by measuring the hardness of the material portion of the obtained refined material, the optimum tempering temperature can be adjusted. Therefore, the tempering temperature only needs to be adjusted so that the core portion is heated at the required predetermined temperature.

Although there are various data in the literature, in the case of S45C material, A1 transformation point generally occurs at a temperature of 719° C. to 727° C., which is appropriate for annealing. Therefore, an upper limit of the tempering temperature needs to be set at a temperature lower than A1 transformation point of the steel material.

In the present embodiment, the tempering condition is maintained at a temperature of 500° C. for 120 minutes, and then cooled. This results in a sorbite structure.

If the heating in the quenching and tempering processing is performed in the atmosphere, the carbon (C) contained in the steel material reacts with oxygen ($O_2$) and water vapor in the atmosphere, such that a decarburized layer is generated, which may cause cracking.

Material surface decarburization and ferrite decarburization occur due to various factors. Due to overheating, the reaction between carbon and oxygen and water vapor in the atmosphere progresses from the surface layer of the steel material toward the center, forming a decarburized layer where carbon is removed. The decarburized layer is also formed by the atmosphere in the furnace during the heat treatment in the tempering processing. When rust or black scale (iron oxide) is formed on the surface of the steel material, or when scratches are formed, oxygen and carbon in iron oxide may further react to form $CO_2$, resulting in decarburization and leading to defects such as cracks. Such decarburization starts earlier when the temperature is closer to the quenching temperature. Therefore, the atmosphere during heating in the quenching processing and the tempering processing is preferably an inert atmosphere to prevent the bonding of carbon and oxygen, and is more preferably an $N_2$ atmosphere considering cost and the like.

In the present embodiment, the steel material (workpiece) is cut into a desired length before the quenching processing. Accordingly, when quenching is performed after cutting the workpiece, the surface area increases, so it is possible to reduce variation in workpiece temperature during quenching, and as a result, it is possible to reduce variation in hardness due to heat treatment. Cutting increases the cooling speed, making it easier to obtain sufficient hardness. Therefore, it is particularly suitable for infeed rolling. The length of the steel material obtained by cutting is not particularly limited, but the steel material can be cut to a length that is approximately 3 to 13 times the diameter of the workpiece, for example.

When a long workpiece before cutting is heated and then cut, uneven heat treatment will likely occur. The reasons are that only longitudinal ends of the long workpiece are cooled first and that the cooling speed is slow, making it difficult to obtain sufficient hardness.

Surface Removal Processing

After the above-described refining processing, a region with a thickness of, for example, 3.0 mm is removed from the surface of the refined material to obtain a refined material (material). As a result, the hardness of the entire material obtained by the surface removal processing falls within a range of approximately 18.0 to 23.5 (HRC), as illustrated in the range of 3.0 to 13.0 mm in FIG. 4, so the hardness variation can be about 5.5 (HRC).

Similar to the first embodiment described above, when the structure and hardness of the refined material obtained by the refining processing are within the desired range, the surface removal processing can be omitted, thereby further improving the yield.

Plastic Working Processing

Next, by forming grooves and teeth on a circumferential surface of the material, for example, by infeed rolling, without annealing and annealing the material obtained by the surface removal processing, it is possible to manufacture a triangular threaded shaft.

In the present embodiment as well, similarly to the first embodiment, when the surface removal processing is not performed, plastic working may be performed on a peripheral surface of the refined material after refining in the plastic working processing.

Although the triangular screw obtained by the manufacturing method according to the present embodiment is not limited in use, the triangular screw can be used in various feed screw mechanisms. For example, the triangular screw can be used in a feed screw mechanism for adjusting a front-rear position or up-down position of a steering wheel.

The manufacturing method according to the present invention is not limited to the method for manufacturing a triangular screw. The manufacturing method according to the present invention can be applied to mechanical structural members of various shapes that require high precision and excellent quality, with grooves formed through plastic working.

In the embodiment described above, the case of a triangular screw with a diameter of 16 mm was described. However, the diameter of the mechanical structural member is not particularly limited, and the present invention can be suitably used for mechanical structural members having a diameter of 24 mm or less, for example. In a mechanical structural member having a diameter larger than 24 mm, the rigidity increases as the diameter increases, so the variation in Rockwell hardness in the material portion increases. Here, for example, when a difference between the Rockwell hardness at the bottom of the groove formed by plastic working and the Rockwell hardness at ½ the radius of the mechanical structural member is 6 (HRC) or less, it is possible to obtain mechanical structural members of high precision and excellent quality.

In addition to threaded shafts such as triangular threaded shafts, mechanical structural members include racks, gears, and the like, and more specifically, the present invention can be applied to a method for manufacturing a ball screw, a trapezoidal threaded shaft, an involute gear, a trochoid gear, a circular arc gear, a serration, and the like.

Next, a mechanical structural member according to the embodiment of the present invention will be described in detail.

Mechanical Structural Member

In the mechanical structural member according to the present embodiment, grooves are formed by plastic working, and teeth are formed between a plurality of longitudinally adjacent grooves when viewed from the side. The mechanical structural member also has a hardened layer on the tooth surface, that is, the tooth bottom, flank surface, and cutting edge surface. The mechanical structural member has a sorbite structure, has a Rockwell hardness of 13 to 28 (HRC) in the region excluding the hardened layer, and has a variation in Rockwell hardness of within 6 (HRC).

The Rockwell hardness in the region excluding the hardened layer is preferably 14 (HRC) or more, more preferably 16 (HRC) or more, even more preferably 17 (HRC) or higher, and particularly preferably 18 (HRC) or higher. The Rockwell hardness in the region excluding the hardened layer is preferably 26 (HRC) or less, more preferably 25 (HRC) or less, even more preferably 24 (HRC) or less, and particularly preferably 23.5 (HRC) or less.

When comparing the Rockwell hardness at the plurality of arbitrary different measurement points described above, the difference between the maximum value and the minimum value is preferably within 5.5 (HRC), more preferably within 5.0 (HRC), even more preferably within 4.5 (HRC), and particularly preferably within 4.0 (HRC).

Since the mechanical structural member according to the present embodiment is obtained by the method for manufacturing a mechanical structural member described above, it is possible to obtain high precision and excellent quality. In the mechanical structural member according to the present embodiment, the structure of the material before grooves and teeth are formed by plastic working is a sorbite structure, and the hardness and variation are adjusted to a predetermined range. Therefore, the structure of the mechanical structural member also has a sorbite structure, and the Rockwell hardness and variation thereof are within the above-described specified range. In particular, with respect to variation in hardness, the mechanical structural member of the present embodiment has distinctive properties compared to mechanical structural members of the related art.

Hereinafter, the Rockwell hardness measurement position will be described using a triangular screw as an example of a mechanical structural member.

Figure 7:
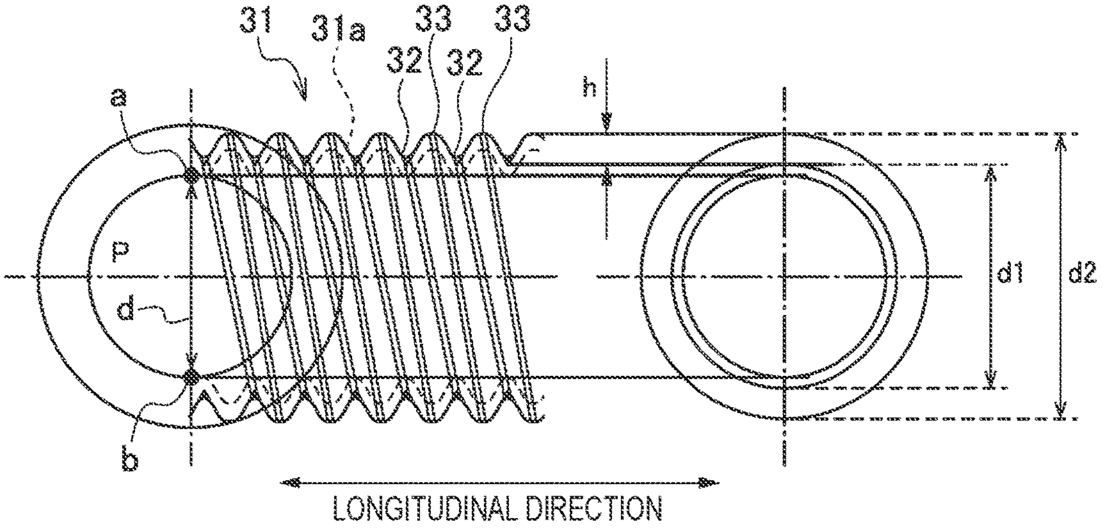
FIG. 7 is a schematic diagram illustrating a triangular threaded shaft for explaining a hardness measurement position.

FIG. 7 is a schematic diagram illustrating a triangular threaded shaft for explaining a hardness measurement position. FIG. 7 shows a side surface of the triangular threaded shaft in a direction parallel to an axial direction and a cross section in a direction perpendicular to the axial direction.

As illustrated in FIG. 7, a triangular threaded shaft 31 has grooves 32 formed by infeed rolling, and thus teeth 33 are formed between each of a plurality of grooves 32 adjacent to each other in a longitudinal direction. When the grooves 32 and teeth 33 are formed not only by infeed rolling but also by plastic working, a hardened layer 31*a* is formed in a processed area (tooth surface). Therefore, in the present embodiment, the Rockwell hardness and variation thereof are defined for a region P excluding the hardened layer 31*a* from a region of which the diameter is a tooth root diameter d1. The region P refers to a region inside P.

Specifically, it is preferable to measure the Rockwell hardness of a diameter portion (straight line portion) d from a random position a on a surface layer of the region P to a position b facing thereto.

In the case of the triangular threaded shaft 31, when a tooth height is set as h (mm), a tooth root diameter (trough diameter) is set as d1 (mm), a tooth tip diameter is set as d2 (mm), and a length of the diameter portion of the region P is set as d (mm), a relationship between the tooth tip diameter d2 and the tooth root diameter d1 is expressed by the following equation (1). A relationship between the diameter portion d of the region P and the tooth root diameter d1 is expressed, for example, by the following equation (2).

$$d1 = d2 - 2h \quad (1)$$

$$d = 0.88d1. \quad (2)$$

In the present embodiment, when measuring the Rockwell hardness, the diameter portion d of the region P excluding the hardened layer 31*a* is targeted, as described above. However, for example, the region from a center of the triangular threaded shaft 31 to (0.88 d1/2) may be defined as the region P, and the diameter portion d thereof may be targeted.

The mechanical structural members according to the present invention are not limited to the above-described triangular threaded shafts, but target various mechanical structural members such as ball screws, trapezoidal threaded shafts, involute gears, trochoid gears, circular arc gears, and serrations. In the case of such various shapes, it is more preferable to select a plurality of measurement points where variation in hardness is likely to occur. In any case, the Rockwell hardness in the region excluding the hardened layer is within a range of 13 to 28 (HRC), and the variation in Rockwell hardness is within 6 (HRC). The preferred range of Rockwell hardness in the region excluding the hardened layer and the preferred range of variation in Rockwell hardness are as described above.

EXAMPLES

Invention examples and comparative examples of the mechanical structural member and the manufacturing method thereof according to the present embodiment will be described below.

Manufacture of Mechanical Structural Member (Triangular Threaded Shaft)

Quenching Processing

S45C steel materials were prepared and quenched in a batch furnace at the quenching temperature and time shown in Table 1 below.

Tempering Processing

Then, based on the graph illustrating a relationship between tempering temperature and hardness in FIG. 6, the heating temperature for tempering was set so that the Rockwell hardness becomes 13 to 28 (HRC), and tempering was performed to obtain a refined material.

When setting the heating temperature for tempering based on FIG. 6, to set the Rockwell hardness after tempering to 23 (HRC), the tempering temperature may be set to, for example, 500° C. As a result, a hardness of about 23 (HRC) can be obtained after tempering, and it is possible to reduce the variation in hardness between the center and surface of the material portion, and obtain a sorbite structure. As a result, particle size can be stabilized.

Figure 8:
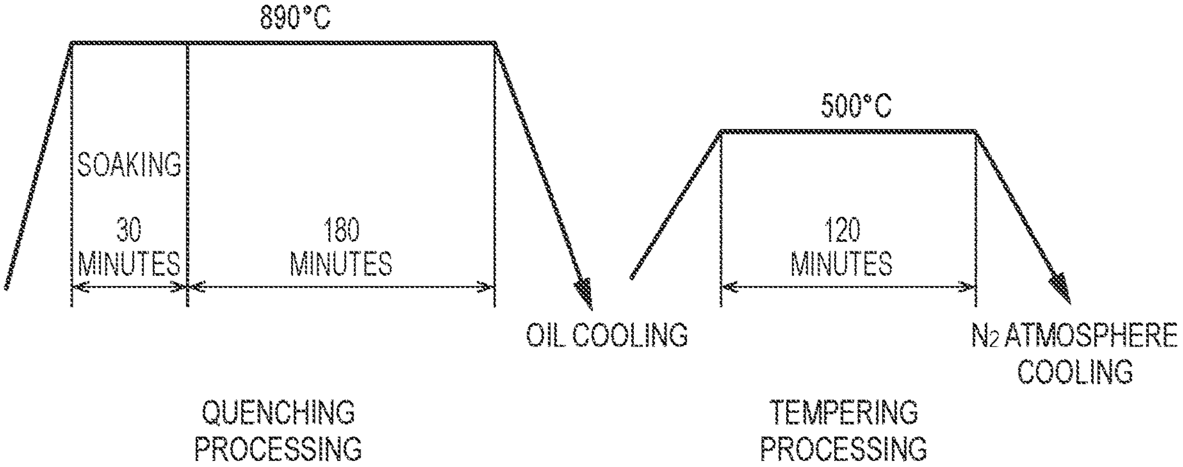
FIG. 8 is a schematic diagram illustrating quenching and tempering conditions of an invention example No. 1.

As an example, the hardening and tempering conditions of an invention example No. 1 are illustrated in FIG. 8.

As illustrated in FIG. 8, in the invention example No. 1, to make the temperature distribution in the furnace constant during the quenching processing, the invention example No. 1 was heated to 890° C., soaked for 30 minutes, held at the same temperature for 180 minutes, and cooled with oil. Then, as tempering processing, the invention example No. 1 was heated to 500° C. in an $N_2$ atmosphere, held for 120 minutes, and then cooled.

An invention example No. 2 shown in Table 1 was held at a temperature of 860° C. for 90 minutes as quenching processing, and then heated to a temperature of 620° C. in an air atmosphere as tempering processing, held for 120 minutes, and then cooled. For an invention example No. 3, after being held at a temperature of 860° C. for 90 minutes as tempering processing, the invention example No. 3 was heated to a temperature of 650° C. in an air atmosphere, held for 120 minutes, and then cooled.

On the other hand, the refined material of a comparative example No. 1 was a bar material that has been refined by a steel manufacturer under the normal refining conditions for the S45C steel material, and then drawn out with a round die to adjust the bar diameter and harden the surface thereof.

Figure 9:
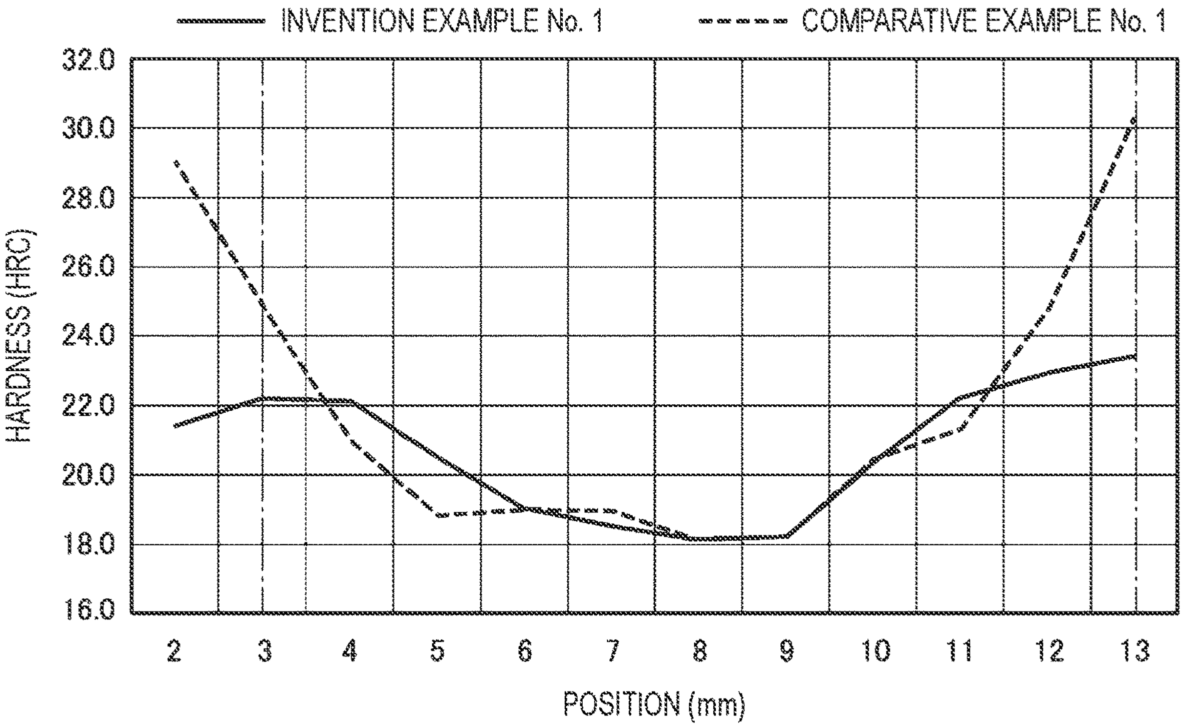
FIG. 9 is a graph diagram illustrating a relationship between hardness and position in invention example No. 1 and comparative example No 1, where a vertical axis is Rockwell hardness and a horizontal axis is a position of a surface layer in a cross section perpendicular to a longitudinal direction of a refined material.

For the invention example No. 1 and the comparative example No. 1, the results of measuring the Rockwell hardness of the material portion of the refined materials after the tempering processing are shown in FIG. 9.

Then, a 3.0 mm thick region was removed from the surface of each refined material, and infeed rolling was performed to produce triangular threaded shafts.

Evaluation of Triangular Threaded Shaft

In the obtained triangular threaded shaft, the Rockwell hardness was measured for the diameter portion d in the region P excluding the hardened layer due to rolling, and the variation in hardness was calculated. Runout of the thread groove was measured to evaluate machining accuracy.

The runout of the thread groove can be obtained, for example, by bringing a spherical probe into contact with a flank surface of the thread groove while supporting both tips of a threaded shaft (workpiece) and measuring an amount of displacement of the probe in a radial direction of the threaded shaft while the probe moves over the entire lead of the threaded shaft. and thereby processing accuracy can be evaluated. When measuring the runout of the thread groove by the above-described measurement method, several leads may be measured, or the threaded shaft may be rotated only one time and the runout for one lead may be measured. When measuring the runout of several leads or one lead, it is preferable to measure at a central portion in the longitudinal direction of an effective range of the threaded shaft, excluding the incompletely threaded portions at both ends of the threaded shaft.

The measurement results of Rockwell hardness and processing accuracy are also shown in Table 1 below. In the present example, for machining accuracy, a maximum value and a minimum value of the displacement amount of the probe, the variation (difference between the maximum value and the minimum value), and the average runout value (average value of the displacement amount) were calculated. FIG. 10 shows microscopic photographs of metal structures of the invention example No. 1 and comparative example No. 1 after refining (before the surface removal processing). The microscopic photographs shown in FIG. 10 was taken after etching using nital.

TABLE 1

| No. | | Refining conditions: Quenching temperature, time | Tempering temperature, time | Atmosphere | Rockwell hardness (HRC) | Variation in Rockwell hardness (HRC) | Machining accuracy (Runout of thread groove) (mm): Average runout value | Variation | Maximum value | Minimum value |
|---|---|---|---|---|---|---|---|---|---|---|
| Invention examples | 1 | 890° C. 0.5 H (soaking) + 3.0 H | 500° C. 2.0 H | $N_2$ | 18.0 to 23.5 | 5.5 | 0.015 | 0.016 | 0.023 | 0.007 |
| | 2 | 860° C. 1.5 H | 620° C. 2.0 H | atmospheric air | 16.0 to 21.0 | 5.0 | 0.027 | 0.048 | 0.056 | 0.008 |
| | 3 | 860° C. 1.5 H | 650° C. 2.0 H | atmospheric air | 13.0 to 17.0 | 4.0 | 0.036 | 0.067 | 0.075 | 0.008 |
| Comparative example | 1 | After refining by steel manufacturer, coil is pulled out | | | 18 to 31 | 13 | 0.049 | 0.075 | 0.093 | 0.018 |

As shown in FIG. 9 and Table 1, in the invention example No. 1, the steel material is sufficiently quenched to the center and tempered so that the range of hardness and variation thereof in the diameter portion are reduced. Therefore, the material portion after refining became a uniform sorbite structure, the Rockwell hardness of the material portion was within the range of 18.0 to 23.5 (HRC), and the variation in hardness was within 6 (HRC). As a result, the threaded shaft obtained by the infeed rolling processing had less runout of the threaded shaft and had excellent processing accuracy.

Even in the invention examples No. 2 and No. 3, the steel material was sufficiently quenched to the center, and the tempering was performed to reduce the hardness and variation thereof in the diameter portion, so although the range of hardness was lower than that of the invention example No. 1, the variation in hardness was within 6 (HRC).

According to the relationship between Rockwell hardness and tempering temperature illustrated in FIG. 6, when the tempering temperature is 650° C., the Rockwell hardness is less than 13 (HRC). However, as described above, Rockwell hardness changes depending on various other conditions, so the Rockwell hardness of the invention example No. 2 which was tempered at a temperature of 620° C. was 16.0 to 20.0 (HRC), and the Rockwell hardness of the invention example No. 3 which was tempered at a temperature of 650° C. was 13.0 to 17.0 (HRC). As a result, both were within the desired range. Therefore, in comparison with the comparative example No. 1, the thread machining accuracy was good in all cases.

On the other hand, in the comparative example No. 1, the hardness increased rapidly from the center of the threaded shaft toward the surface, and the Rockwell hardness and variation fell outside the range defined by the present invention. Therefore, the average runout value and variation of the thread groove were large, and the processing accuracy was low.

As illustrated in FIG. 10, the invention example No. 1 had a sorbite structure as a whole. Since fine crystal grains were formed from the surface to a depth of about 0.2 mm, it was confirmed that the sorbite structure remained even after rolling. Although the area illustrated in FIG. 10 is removed in the surface removal processing, the area to be removed can be reduced in the invention example No. 1.

On the other hand, in the comparative example No. 1, although there is a fine layer on the surface, the particle size between the surface and the core is not stable. Therefore, the hardness curve illustrated in FIG. 9 is not substantially flat, but has a distinct U-shape. The structure is far from uniform. Therefore, when an attempt is made to remove the surface until the hardness curve becomes substantially flat, it is necessary to increase the thickness to be removed, which increases manufacturing costs.

As described above, the following matters are disclosed in the specification.

(1) A mechanical structural member in which grooves and teeth are formed by plastic working and a hardened layer is formed on a surface of the teeth, where the mechanical structural member has a sorbite structure, and Rockwell hardness in a region excluding the hardened layer is 13 to 28 (HRC), and a variation in the Rockwell hardness is within 6 (HRC).

According to such configuration, high precision and excellent quality can be obtained.

(2) The mechanical structural member according to (1), where the grooves and teeth are formed by infeed rolling.

According to such configuration, it is possible to improve the processing accuracy of the groove.

(3) The mechanical structural member according to (1) or (2), where the mechanical structural member is one type selected from a screw shaft, a rack, a gear, and a serration.

According to such configuration, machining accuracy can be further improved, particularly in the screw shaft, rack, gear, and serration.

(4) The mechanical structural member according to any one of (1) to (3), where the variation in the Rockwell hardness is represents a difference between a maximum value and a minimum value when Rockwell hardness is measured for a straight line portion from a random position a on a surface layer to a facing position b in the region excluding the hardened layer, the difference between the maximum value and the minimum value of the Rockwell hardness of the straight line portion is within 6 (HRC), and the maximum value and the minimum value are both within a range of 13 to 28 (HRC).

According to such configuration, even higher precision and superior quality can be obtained.

(5) The mechanical structural member according to (1) or (2), where the mechanical structural member is a triangular threaded shaft with a thread groove formed, the variation in the Rockwell hardness represents a difference between a maximum value and a minimum value when Rockwell hardness is measured in a region of the triangular threaded shaft excluding the hardened layer, for a diameter portion from a random position a on a surface layer to a position b facing in a direction perpendicular to an axis, a difference between the maximum value and the minimum value of the Rockwell hardness of the diameter portion is within 6 (HRC), and the maximum value and the minimum value are both within a range of 13 to 28 (HRC).

According to such configuration, the screw precision of the triangular threaded shaft can be improved.

(6) A method for manufacturing a mechanical structural member according to any one of (1) to (5), the manufacturing method including:

a refining step of refining a steel material to obtain a refined material that has a sorbite structure, has a Rockwell hardness of 13 to 28 (HRC) in a material portion excluding a predetermined thickness from a surface, and has a variation in Rockwell hardness within 6 (HRC) in the material portion; and a plastic working step of performing plastic working on a surface of the refined material where the grooves and teeth are formed, where neither annealing nor annealing is performed between the refining step and the plastic working step.

According to such configuration, productivity is improved, manufacturing costs can be reduced, and a mechanical structural member having high precision and excellent quality can be manufactured.

(7) The method for manufacturing a mechanical structural member according to (6), where the plastic working is infeed rolling processing.

According to such configuration, a groove having excellent processing accuracy can be easily formed.

(8) The method for manufacturing a mechanical structural member according to (6) or (7), where the refining step includes, a quenching step of heating and then cooling the steel material, and a tempering step of heating and cooling the steel material after the quenching step to form a sorbite structure, heating temperature and holding time in the quenching step are adjusted so that the steel material after the quenching step has a martensitic single phase structure, and in the tempering step, a heating temperature for tempering is adjusted based on a relationship between tempering temperature and hardness specific to the steel material so that Rockwell hardness of the material portion is 13 to 28 (HRC) and a variation in Rockwell hardness in the material portion is within 6 (HRC).

According to such configuration, productivity is further improved, manufacturing costs can be reduced, and a mechanical structural member having high precision and excellent quality can be manufactured.

(9) The method for manufacturing a mechanical structural member according to any one of (6) to (8), where before the refining step, a quenching testing step is provided in which quenching is performed using a test material that has approximately the same shape and composition as the steel material, a structure of the test material after quenching is observed, and a quenching heating condition is selected so that the structure becomes a martensitic single phase structure, and the quenching step is performed using the quenching heating condition selected in the quenching testing step.

According to such configuration, productivity is further improved, manufacturing costs can be reduced, and a mechanical structural member having high precision and excellent quality can be manufactured.

(10) The method for manufacturing a mechanical structural member according to (9), where between the quenching testing step and the tempering step, a tempering testing step is provided in which tempering is performed on a test material after the quenching testing step at a heating temperature selected based on the relationship between the tempering temperature and hardness specific to the steel material, and selecting a tempering heating condition such that the test material has a sorbite structure, Rockwell hardness of the material portion of the test material is 13 to 28 (HRC), and a variation in the Rockwell hardness of the material portion of the test material is within 6 (HRC), and the tempering step is performed using the tempering heating condition selected in the tempering testing step.

According to such configuration, productivity is further improved, manufacturing costs can be reduced, and a mechanical structural member having high precision and excellent quality can be manufactured.

(11) The method for manufacturing a mechanical structural member according to (8), where before the quenching step, after quenching using a refining test material that has approximately the same shape and composition as the steel material, a refining testing step is provided in which the refining test material after quenching is tempered at a heating temperature selected based on the relationship between the tempering temperature and hardness specific to the steel material, the refining testing step is a step of selecting a quenching heating condition and a tempering heating condition such that the refining test material after tempering has a sorbite structure, Rockwell hardness of the material portion is 13 to 28 (HRC), and a variation in the Rockwell hardness in the material portion is within 6 (HRC), the quenching step is performed using the quenching heating condition selected in the refining testing step, and the tempering step is performed using the tempering heating condition selected in the refining testing step.

According to such configuration, the quenching heating conditions and the tempering heating conditions can be determined without conducting a test for determining only the quenching conditions.

Although various embodiments are described above, it is obvious that the present invention is not limited to such examples. It is clear that those skilled in the art can come up with various changes or modifications within the scope of the claims, and it is understood that the changes or modifications naturally fall within the technical scope of the present invention. Each of the constituent elements in the above-described embodiments may be freely combined without departing from the spirit of the invention.

REFERENCE SIGNS LIST

1, 2: round bar material
11: tempered portion
12: softened layer
13, 14, 31*a*: hardened layer

21: test material
31: triangular threaded shaft
32: groove
33: tooth
C: material portion
D: diameter portion

The invention claimed is:

1. A method for manufacturing a mechanical structural member, the method comprising:

refining a steel material to obtain a refined material that has a sorbite structure, has a Rockwell hardness of 13 to 28 HRC in a material portion excluding a predetermined thickness from a surface, and has a variation in Rockwell hardness between a maximum Rockwell hardness and a minimum Rockwell hardness across the material portion within 6 HRC; and plastic working on a surface of the refined material to form a plurality of grooves and teeth thereon, wherein no annealing is performed between the refining of the steel material and the plastic working;

the refining of the steel material comprises:

a quenching step of heating and then cooling the steel material, and a tempering step of heating and cooling the steel material after the quenching step to form the sorbite structure;

in the quenching step, heating temperature and holding time are adjusted so that the steel material after the quenching step has a martensitic single phase structure; and in the tempering step, a heating temperature for tempering is adjusted based on a relationship between tempering temperature and hardness specific to the steel material so that the Rockwell hardness of the material portion is 13 to 28 HRC, and the variation in Rockwell hardness in the material portion is within 6 HRC.

2. The method for manufacturing a mechanical structural member according to claim 1, wherein the plastic working is infeed rolling processing.

3. The method for manufacturing a mechanical structural member according to claim 1, wherein:

before the refining of the steel material, the method further comprises a quenching testing step of quenching a test material that has a same shape and composition as the steel material, observing a structure of the test material after quenching, and selecting a quenching heating condition at which the structure of the test material becomes a martensitic single phase structure; and the quenching step of the steel material comprises quenching the steel material based on the quenching heating condition.

4. The method for manufacturing a mechanical structural member according to claim 3, wherein:

between the quenching testing step and the tempering step, the method further comprises a tempering testing step of tempering the test material at a heating temperature selected based on the relationship between the tempering temperature and hardness specific to the steel material, and selecting a tempering heating condition at which the test material has a sorbite structure, Rockwell hardness of the material portion of the test material is 13 to 28 HRC, and a variation in the Rockwell hardness of the material portion of the test material is within 6 HRC; and the tempering step comprises tempering the steel material based on the tempering heating condition.

5. The method for manufacturing a mechanical structural member according to claim 1, wherein:

before the quenching step of the steel material, and after a refining quenching step using a refining test material that has a same shape and composition as the steel material, the method further comprises:

a refining testing step of tempering the refining test material after quenching the refining test material at a heating temperature selected based on the relationship between the tempering temperature and hardness specific to the steel material, and selecting a quenching heating condition and a tempering heating condition at which the refining test material after tempering has a sorbite structure, Rockwell hardness of the material portion is 13 to 28 HRC, and a variation in the Rockwell hardness in the material portion is within 6 HRC;

wherein the quenching step of the steel material comprises quenching the steel material based on the quenching heating condition; and wherein the tempering step comprises tempering the steel material based on the tempering heating condition.

* * * * *